Oct. 20, 1931.  J. R. OISHEI  1,828,715
SLEET BLADE
Filed Dec. 22, 1927
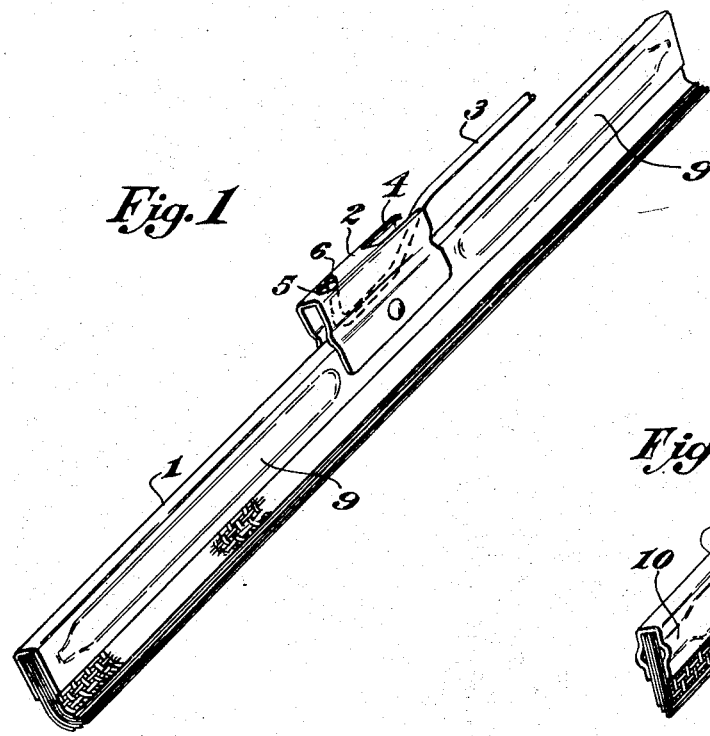
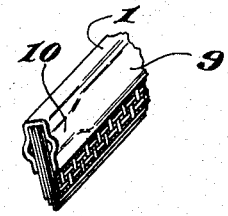
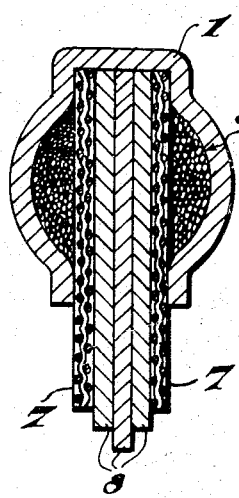 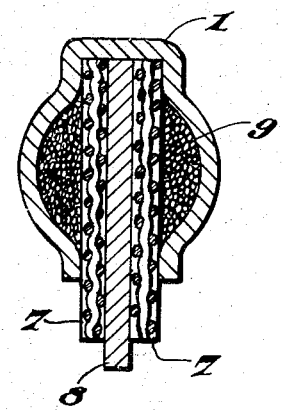

Patented Oct. 20, 1931

1,828,715

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

SLEET BLADE

Application filed December 22, 1927. Serial No. 241,784.

This invention relates to a wiper blade for windshield cleaners.

These blades are usually constructed of a channeled backing strip or holder of metal, between the walls of which is clamped a flexible strip or strips of rubber, the same being designed to flex against the windshield glass to remove the moisture therefrom. In cold weather the motorist will encounter snow and sleet storms or cold rains during which the moist snow, sleet and rain will congeal on and adhere to the windshield thereby beclouding the vision therethrough. Such obscured vision is obviously dangerous and places the motorist under an intense strain and some discomforture.

The problem of satisfactorily removing and avoiding the accumulation of congealed or frozen matter on the windshield has long challenged invention. Various attempts have been made to offer practical solutions to combat this attendant evil of cold weather driving, such as the application of heat to the windshield glass, or the swabbing of the windshield glass with a felt or pad saturated with a solution having a lower freezing point than that of water. The different methods heretofore suggested either involve an elaborate piping system for conducting heated air to the windshield, the subjection of the vehicle storage battery to the additional burden of energizing an electrical resistance adjacent the windshield glass, or, in the use of a chemically saturated wiper element, the excessive application to the windshield of some solution or chemical which would wash down to the bottom of the windshield and flow off into the highly polished automobile finish thereby not only removing the polish and finish but in some instances injuring the surrounding metal parts. Then, too, these chemical-swabbing blades have been very short-lived and cannot be safely relied upon for use subsequent to the initial use.

The present invention has for its objects to provide a sleet blade, the term "sleet" being used generically to include any congealed rain or snow on a windshield, which will be practical in operation and be long-lived; to provide a sleet blade which is readily detachable from the wiper-carrying arm whereby the normal or usual wiper blade may expeditiously be replaced by the sleet blade and without the use of tools; to provide a floppingly mounted sleet blade which will swab and then wipe the windshield on each stroke; to provide a multi-ply sleet blade having its outer plies of a textile material and the intermediate ply or plies of a flexible rubber; to provide a sleet blade having a chemically-impregnated wiping surface communicating with a supply of normally dry chemical which will begin feeding to the wiping surface when subjected to moisture; and to provide a sleet blade embodying a channeled holder equipped with chemical-containing means which will be brought into communicating relation with the wiper strip when the latter is clamped therein.

Referring more in detail to the accompanying drawings,

Fig. 1 is a perspective view showing the improved blade attached to a wiper-moving arm.

Fig. 2 is a fragmentary perspective view showing one end of the blade before the chemical is sealed therein, Fig. 3 is a cross sectional view of the improved sleet blade, and Fig. 4 is a similar view of the improved sleet blade equipped with a fewer number of cleaning strips.

Referring more in detail to the drawings, the numeral 1 designates a channeled holder or backing strip of metal, and over the back of this holder is secured an attaching clip 2 by which the blade may be readily attached, very expeditiously and without the use of tools, to the wiper-operating arm 3. The mounting of this arm and the construction of the clip are similar to those shown in the co-pending application of Henry Hueber, filed July 29, 1927, under Serial No. 209,262. As shown, the clip is provided in its back with an entrance slot 4 and a spaced opening 5 the latter being designed to receive the free end 6 of the lower angular portion of the wiper arm 3, the connection being effected by first straddling the walls of the slot 4 over the arm 3, as when the blade assumes a right-angular relation to the major longitudinal axis of the wiper arm, to engage said end 6 in its opening, and then moving the wiper blade to the position substantially that shown in Fig. 1. The resilient pressure of the arm causes the latter to bear on the back of the holder 1 while the blade is permitted a certain amount of flop the degree of which is determined by the relative size of the opening 5 and the terminal 6. This flop is especially desired in windshield cleaners to effect a cleaner wiping action.

The blade is preferably of a multi-ply fabrication or make-up and comprises spaced, outer, chemical-applying plies 7, which are the outermost or side plies, and one or more cleaning or wiping plies 8 which are preferably in the form of flexible rubber strips. In Fig. 4 a single rubber ply is shown interposed between the two lateral and chemical-applying plies 7 while in Fig. 3 there is depicted three wiping plies between the lateral chemical-applying plies. The wiping edges of the several strips or plies are progressively stepped, thereby providing an angular wiping edge for the blade which presents two wiping faces each face of which comprises the wiping edges of one of the chemical-applying plies and the adjacent wiping ply or plies. During each wiping stroke the wiping edge of the chemical-applying ply is in advance of the rubber wiping edges so that the congealed matter will initially have a chemical applied thereto before the wiping ply or plies come into contact therewith. The resulting action is that the chemical-applying ply applies the chemical to soften the congealed matter which is wiped free of the glass by the next succeeding wiper ply, and the glass is ultimately wiped practically clean of any residue by the second succeeding wiping ply which latter is the central and widest strip shown in Fig. 3.

The chemical-applying or feeding piles are preferably in the form of wicks which have a very good degree of capillary attraction for moisture so that as the windshield glass is being wiped a certain amount of moisture will be absorbed by the respective wick plies and will travel up the same within the holder 7 where it will contact with the dry chemical and begin to dissolve the same whereby the dissolved portion of the chemical will flow down the wicking 7 and be applied to the windshield. This dissolving and feeding of the chemical to the point of application is very gradual so in order to have the sleet blade function immediately after being put into use, it is preferred to dip or saturate the wick plies in a solution of this chemical and the plies permitted to dry before being inserted in the holder 1. Then, when the sleet blade is first put into use, the dried chemical with which the wick plies are impregnated will immediately re-dissolve upon contact with the moistened surface of the windshield. This will immediately result in melting the congealed or icy coating on the windshield so that it can be removed from the field of vision. Obviously, after the chemical with which the plies 7 were originally impregnated begins functioning to loosen the congealed or icy coating on the windshield, the wicking will become moist so that the moisture will travel up inside of the holder to the supply of dry chemical, there dissolve a portion of the latter, and the dissolved portion will then flow down the wicking to replenish the original supply of chemical in said outer plies 7. Thus, the chemical-applying plies will be impregnated with the chemical at all times, or until the supply of dry chemical has been exhausted. Therefore, if, after the unfavorable weather conditions have subsided, the motorist desires to remove the sleet blade and substitute the usual rain blade, the saturated plies 7 will again dry out but nevertheless be substantially fully impregnated with the chemical so that in subsequent usage the outer plies will be in condition to function immediately upon contact with a moist surface.

For example, the wick plies may be dipped in a brine or salt solution and dried. In this instance the dry chemical will also be salt for replenishing the supply of salt in the wick plies.

The supply of dry chemical is preferably housed within the holder 1, and in the form herein depicted such container is provided in the wall of the holder by embossing the same outwardly. Any number of such embossments 9 may be provided, each side wall of the holder being herein depicted as embodying two embossments, one on each side of the clip 2. These embossments are formed by pressing outward bulges in the side walls of the holder, thereby providing a chamber or magazine in the inner wall across which the adjacent ply 7 extends as it is most clearly shown in Figs. 3 and 4. In the initial steps of forming the holder, small throats or necks 10 are provided simultaneously with the formation of the chambers 9, which throats or necks extend through the adjacent ends of the side walls of the holder whereby after the plies have been clamped in position within the holder a quantity of dry and preferably powdered or granular chemical may be injected into the chamber through the comparatively small entrance openings 10. This may readily be accomplished by inserting a nozzle into the neck opening and forcing the dry chemical therethrough into the chamber. Subsequent to inserting the supply of dry chemical into the different chambers the neck openings are closed by collapsing or pressing the metal at these points down onto the interposed plies of the blade. This is shown in Fig. 1 wherein it will be noted that the end portions of the side walls of the holder are practically undistorted and that the compartments are entirely closed to the outside except through the wicking by which the moisture reaches the contained dry chemical. This construction brings the side walls into clamping engagement with the interposed plies entirely about the chambers 9.

The motorist will obviously wish to save his sleet blade for emergencies only and therefore the method of attaching the sleet blade to the wiper-carrying arm is identical with the mounting of the ordinary blade on the arm so that the replacement and substitution of the different blades may readily and expeditiously be effected without the use of tools. This is especially desirous when one is out driving and finds that the moisture is congealing on the glass before him. In a very short interval of time he can change from one blade to the other and have his sleet blade working so as to avoid any beclouding condition on the windshield surface. During use the chemical will gradually become dissolved and feed down to the point of contact with the glass so that a constant supply of chemical will be supplied. After once wetting the chemical plies, such plies will remain saturated throughout their use so that if and when the sleet blade is removed from the wiper arm and stored away for future emergencies and the plies eventually dry out, they will nevertheless be impregnated with the chemical for functioning immediately upon contact with a wet surface when subsequently called into operation. Consequently the supply of dry chemical will last almost indefinitely and will render the wiper blade useful over a very long period of time.

What is claimed is

1. A wiper blade comprising a channeled holder having a relatively shallow bulge in one side wall forming a chamber, an absorbing wiping body clamped between the side walls of the channel, and a dry chemical, dissoluble in water, contained within the chamber-forming bulge and in contact with the wiping body, the side of the chamber which opens into the channel of the holder being open for substantially the entire width of the chamber, said absorbing wiping body constituting substantially the entire side of the chamber whereby the dry chemical will be retained within the chamber until dissolved.

2. A wiper blade adapted to be floppingly mounted on the wiper-carrying arm of a windshield cleaner, comprising a holder embodying chemical-holding means, a wiper ply secured in the holder, and a pair of chemical-applying plies mounted on the opposite sides of said wiper ply and secured in the holder in communication with said means, said chemical-applying plies projecting a shorter distance from the holder than said wiper ply and adapted respectively to contact with the glass forwardly of the wiper ply in one direction of movement and lift from the glass in the opopsite direction of movement in alternation with the companion chemical-applying ply.

JOHN R. OISHEI.